United States Patent
Brownscheidle et al.

(10) Patent No.: US 9,870,231 B2
(45) Date of Patent: *Jan. 16, 2018

(54) AGE BASED FAST INSTRUCTION ISSUE

(71) Applicant: International Business Machines Corporation, Armonk, NY (US)

(72) Inventors: Jeffrey C. Brownscheidle, Seattle, WA (US); Sundeep Chadha, Austin, TX (US); Maureen A. Delaney, Burlington, VT (US); Dung Q. Nguyen, Austin, TX (US)

(73) Assignee: International Business Machines Corporation, Armonk, NY (US)

( * ) Notice: Subject to any disclaimer, the term of this patent is extended or adjusted under 35 U.S.C. 154(b) by 0 days.

This patent is subject to a terminal disclaimer.

(21) Appl. No.: 15/617,287

(22) Filed: Jun. 8, 2017

(65) Prior Publication Data

US 2017/0269938 A1 Sep. 21, 2017

Related U.S. Application Data

(63) Continuation of application No. 15/145,835, filed on May 4, 2016, which is a continuation of application
(Continued)

(51) Int. Cl.
*G06F 9/38* (2006.01)
(52) U.S. Cl.
CPC .......... *G06F 9/3855* (2013.01); *G06F 9/3836* (2013.01)
(58) Field of Classification Search
None
See application file for complete search history.

(56) References Cited

U.S. PATENT DOCUMENTS

| 5,519,864 A | 5/1996 | Martell et al. |
| 6,654,869 B1 | 11/2003 | Kahle et al. |

(Continued)

FOREIGN PATENT DOCUMENTS

EP 1164472 A2 12/2001

OTHER PUBLICATIONS

Baugh et. al., "Decomposing the load-store queue by function for power reduction and scalability", IBM J. Res. & Dev., vol. 50, No. 2/3, Mar./May 2006, 0018-8646/06, pp. 287-297, © 2006 IBM.
(Continued)

*Primary Examiner* — Eric Coleman
(74) *Attorney, Agent, or Firm* — Isaac J. Gooshaw

(57) ABSTRACT

In an approach for selecting and issuing an oldest ready instruction in an issue queue, one or more processors receive one or more instructions in an issue queue. Ready to execute instructions are identified. An age of the instructions are represented in a first age array. One or more subsets of the instructions are generated for subset age arrays that each hold an age of the instructions in a subset. A 1-hot signal is generated that identifies an oldest ready instruction in the first age array and a 1-hot signal is simultaneously generated that identifies an oldest ready instruction in each subset age array. A candidate instruction is selected with each subset signal that is represented in the subset age array of the subset signal, wherein a candidate instruction is an oldest ready instruction in the subset age array. A candidate instruction is selected with the major signal and issued.

1 Claim, 6 Drawing Sheets

Related U.S. Application Data

No. 14/809,291, filed on Jul. 27, 2015, now Pat. No. 9,367,322.

(56) References Cited

U.S. PATENT DOCUMENTS

| | | | |
|---|---|---|---|
| 6,983,358 B2 | 1/2006 | Elmer | |
| 7,350,056 B2 | 3/2008 | Abernathy et al. | |
| 8,041,928 B2 | 10/2011 | Burky et al. | |
| 8,656,401 B2 | 2/2014 | Venkataramanan et al. | |
| 8,825,988 B2 | 9/2014 | Rupley et al. | |
| 9,367,322 B1 | 6/2016 | Brownscheidle et al. | |
| 9,389,870 B1 | 7/2016 | Brownscheidle et al. | |
| 9,632,825 B2 | 4/2017 | Chan | |
| 2007/0198812 A1 | 8/2007 | Abernathy et al. | |
| 2008/0320274 A1 | 12/2008 | Singh et al. | |
| 2008/0320478 A1* | 12/2008 | Singh | G06F 9/3838 718/102 |
| 2009/0063735 A1 | 3/2009 | Ng et al. | |
| 2010/0077181 A1 | 3/2010 | Abernathy et al. | |
| 2010/0262813 A1 | 10/2010 | Brown et al. | |
| 2011/0185159 A1 | 7/2011 | Bishop et al. | |
| 2012/0291037 A1 | 11/2012 | Venkatararnanan et al. | |
| 2014/0129800 A1 | 5/2014 | Deutschle et al. | |
| 2016/0202977 A1 | 7/2016 | Craske et al. | |
| 2017/0031686 A1 | 2/2017 | Brownscheidle et al. | |

OTHER PUBLICATIONS

Kessler, R. E., "The Alpha 21264 Microprocessor", Mar.-Apr. 1999, pp. 24-36, 0272-1732/99, IEEE Micro, © 1999 IEEE.

Yeager, Kenneth C., "The MIPS R1O000 Superscalar Microprocessor", Apr. 1996, pp. 28-40, 0272-1732/96, IEEE Micro, © 1996 IEEE.

IBM Appendix P,"List of IBM Patents of Patent Applications Treated as Related", dated Jun. 8, 2017, 2 pages.

IBM Appendix P, "List of IBM Patents or Patent Applications to be Treated as Related", dated Jul. 27, 2017, 2 pages.

Brownscheidle et al., "Age Based Fast Instruction Issue", U.S. Appl. No. 15/661,422, filed Jul. 27, 2017, pp. 1-21.

\* cited by examiner

AGE BASED FAST INSTRUCTION ISSUE

BACKGROUND OF THE INVENTION

The present invention relates generally to the field of processor microarchitecture and more particularly to the scheduling and issuing of instructions to execution units in a processor.

A processor often fetches instructions from an instruction cache into an issue unit (an issue queue), from which the instructions are issued to one or more execution units for execution. Instructions are issued from an issue queue, when appropriate conditions are met, to execution units or to reservation stations associated with the execution units. It is often advantageous to issue an instruction that has been in the issue queue the longest (i.e., the oldest instruction in the queue), out of all instructions in the queue that are ready to execute. It is more likely that other instructions are waiting for the data produced by the oldest instruction than for data produced by a younger instruction in the issue queue.

The logic in the issue queue is often a critical path of the logic in the processor, i.e., the cycle time of the processor (and therefore often its performance) may depend on the speed of the issue queue. Several factors influence the speed of an issue queue, e.g., the number and type of logic gates in its critical path and the physical distances between the gates, which is influenced by the area consumed by its logic and signal paths. The area consumed by signal paths tends to spread logic out, increasing the distance between logic gates, and causing signal paths to lengthen. The increase in the length of signal paths increases the capacitance of the paths (potentially increasing energy consumption) and increases the propagation delay between the logic gates, which can increase cycle time and decrease performance. Issue queue structures that are capable, area efficient, and fast are an active area of research and development.

SUMMARY

Aspects of an embodiment of the present invention disclose a method, program product, and system for selecting and issuing an oldest ready instruction in an issue queue. The method includes receiving, by one or more processors, one or more instructions into one or more entries in an instruction table in an issue queue. The method further includes identifying, by one or more processors, instructions that are ready to execute among the one or more instructions in the instruction table with a ready bus. The method further includes representing, by one or more processors, an age of each of the one or more instructions in the instruction table in a first age array wherein an age of an instruction is an age that is relative to each of the one or more instructions in the first age array. The method further includes generating, by one or more processors, one or more subsets of the one or more instructions that are associated in one-to-one correspondence with one or more subset age arrays, wherein a subset age array holds a representation of an age of up to 2 instructions in an associated subset that is relative to each of the one or more instructions in the associated subset. The method further includes generating, by one or more processors, a first 1-hot signal that identifies an oldest ready instruction with an age represented in the first age array and identified as ready on the ready bus, and simultaneously generating with each subset age array, an associated second 1-hot signal that identifies an oldest ready instruction with an age that is represented in the associated subset age array and is identified as ready on the ready bus. The method further includes selecting, by one or more processors, with each second 1-hot signal, a candidate instruction in the issue queue that is represented in the subset age array that is associated with the second 1-hot signal, wherein a candidate instruction is an oldest ready instruction represented in a subset age array. The method further includes selecting, by one or more processors, a candidate instruction with the first 1-hot signal and issuing the candidate instruction.

DETAILED DESCRIPTION

Detailed embodiments of the present invention are disclosed herein with reference to the accompanying drawings. It is to be understood that the disclosed embodiments are merely illustrative of potential embodiments of the present invention and may take various forms. In addition, each of the examples given in connection with the various embodiments is intended to be illustrative, and not restrictive. Further, the figures are not necessarily to scale, some features may be exaggerated to show details of particular components. Therefore, specific structural and functional details disclosed herein are not to be interpreted as limiting, but merely as a representative basis for teaching one skilled in the art to variously employ the present invention.

References in the specification to "one embodiment", "an embodiment", "an example embodiment", etc., indicate that the embodiment described may include a particular feature, structure, or characteristic, but every embodiment may not necessarily include the particular feature, structure, or characteristic. Moreover, such phrases are not necessarily referring to the same embodiment. Further, when a particular feature, structure, or characteristic is described in connection with an embodiment, it is submitted that it is within the knowledge of one skilled in the art to affect such feature, structure, or characteristic in connection with other embodiments whether or not explicitly described.

Embodiments of the present invention recognize that the performance of a processor is often dependent in part on a fast, efficient issue queue and that speed and logic path balance (i.e., various paths through a logic have similar delays) in logic is often obtained with parallelism.

Figure 1:
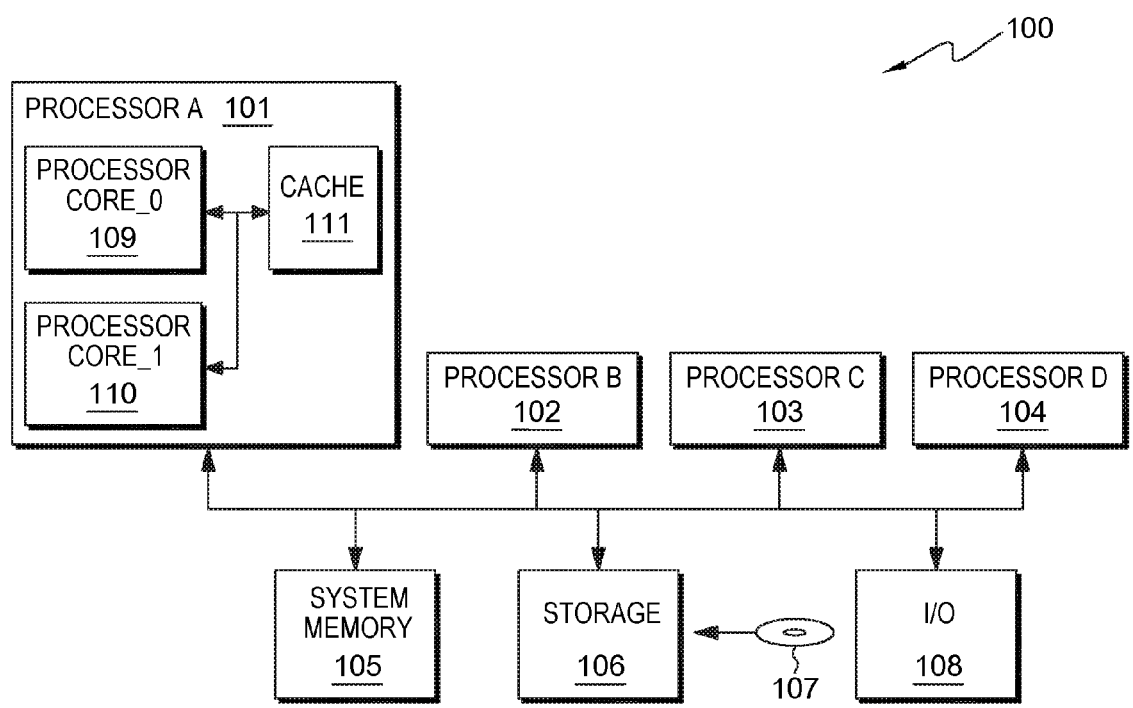
FIG. 1 depicts a block diagram of a multiprocessor computing system, in accordance with an embodiment of the present invention.

FIG. 1 depicts multiprocessor computer 100 that, in some scenarios and embodiments, contains processor A 101, processor B 102, processor C 103, processor D 104, system memory 105, storage 106, hard disk 107, and I/O 108.

Processor A 101 is a multicore processor that contains processor core_0 109, processor core_1 110, and L2 cache 111. The internal structures of processor B 102, processor C 103, and processor D 104 are essentially similar to that of processor A 101. Processor A 101, processor B 102, processor C 103, processor D 104 can compute separate independent jobs or cooperatively compute independent pieces of one or more jobs in parallel.

Figure 2:
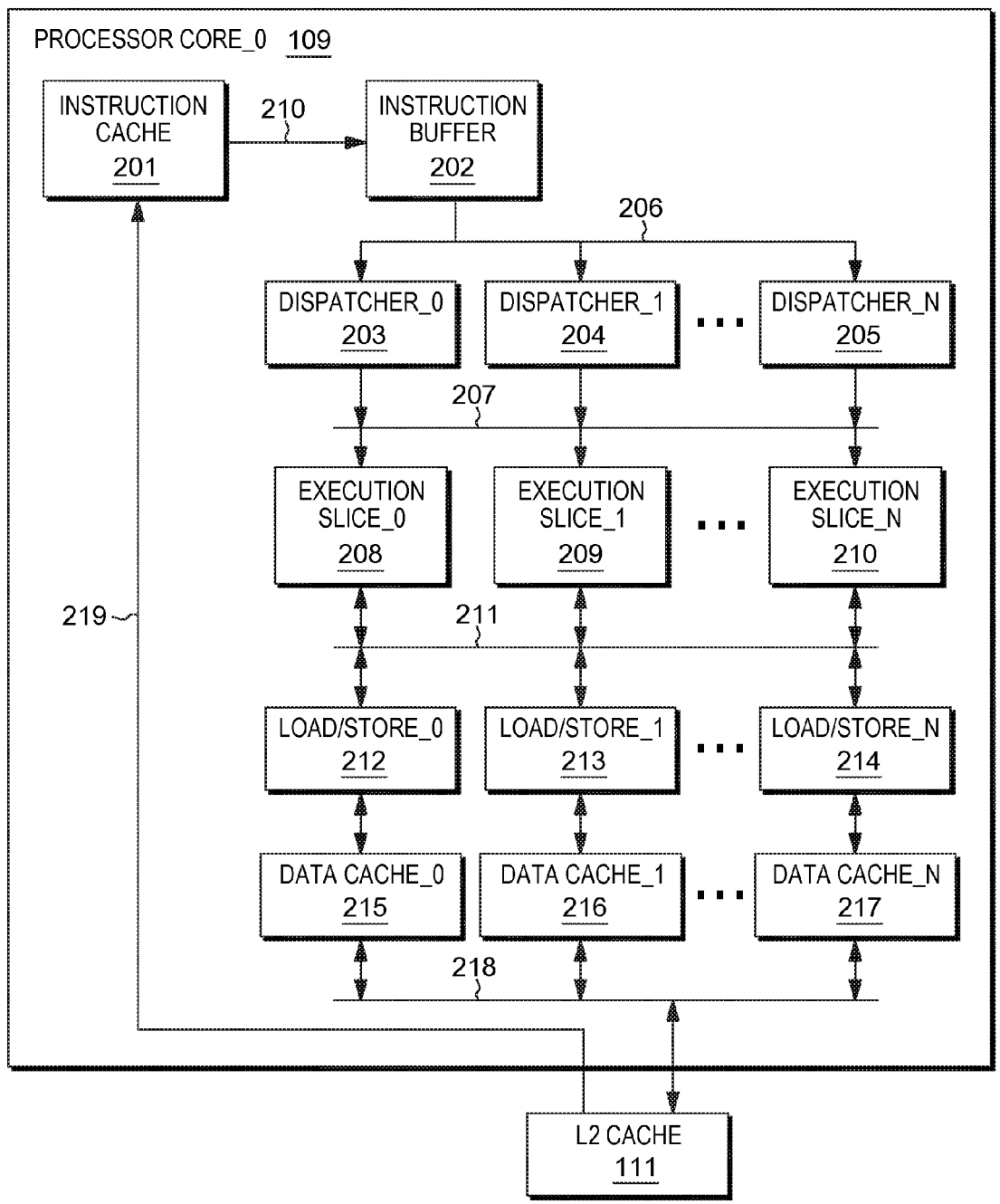
FIG. 2 depicts a block diagram of processor core_0 that is depicted in FIG. 1, in accordance with an embodiment of the present invention.

FIG. 2 depicts processor core_0 109 in more detail. In some scenarios and embodiments, processor core_0 109 contains instruction buffer 202, instruction buffer bus 206, dispatcher_0 203, and n other dispatchers (dispatcher_1 204 through dispatcher_N 205). Processor core_0 109 also contains dispatcher bus 207, execution slice_0 208, and n other execution slices, execution slice_1 209 through execution slice_N 210. Processor core_0 109 also contains execution slice bus 211, load/store_0 212, and n other load/store units (load/store_1 213 through load/store_N 214). Processor core_0 also contains data cache_0 215, and n other data caches (data cache_1 216 through data cache_N 217). Processor core_0 also contains data cache bus 218, instruction cache bus 219, and instruction cache 201. In an embodiment, instruction buffer 202 fetches instructions from instruction cache 201 for execution in processor core 109. Instruction cache 201 fetches instructions from L2 cache 111 when an access by instruction buffer 202 misses in instruction cache 201.

In some scenarios and embodiments, instruction buffer 202 forwards instructions to dispatcher_0 203, and n other dispatchers, dispatcher_1 204 through dispatcher_N 205, over instruction buffer bus 206. Dispatcher_0 203, and n other dispatchers (dispatcher_1 204 through dispatcher_N 205), route instructions to execution slice_0 208, and n other execution slices (execution slice_1 209 through execution slice_N 210), over dispatcher bus 207. The instructions routed over dispatcher bus 207 are executed in the execution slices. During their execution, the instructions can store and read data from memory, which is stored and fetched by load/store_0 212, and n other load/store units (load/store_1 213 through load/store_N 214). Load/store_0 212, and the n other load/store units (i.e., load/store_1 213 through load/store_N 214), are connected in one-to-one correspondence to data cache_0 215, and n other data caches (data cache_1 216 through data cache_N 217). For example, load/store_0 213 stores data to and reads data from data cache_0 215, and load/store_1 213 stores data to and reads data from data cache_1 216. When data is requested by an execution slice and a miss occurs in the corresponding data cache, L2 cache 111 is accessed over data cache bus 218.

Figure 3:
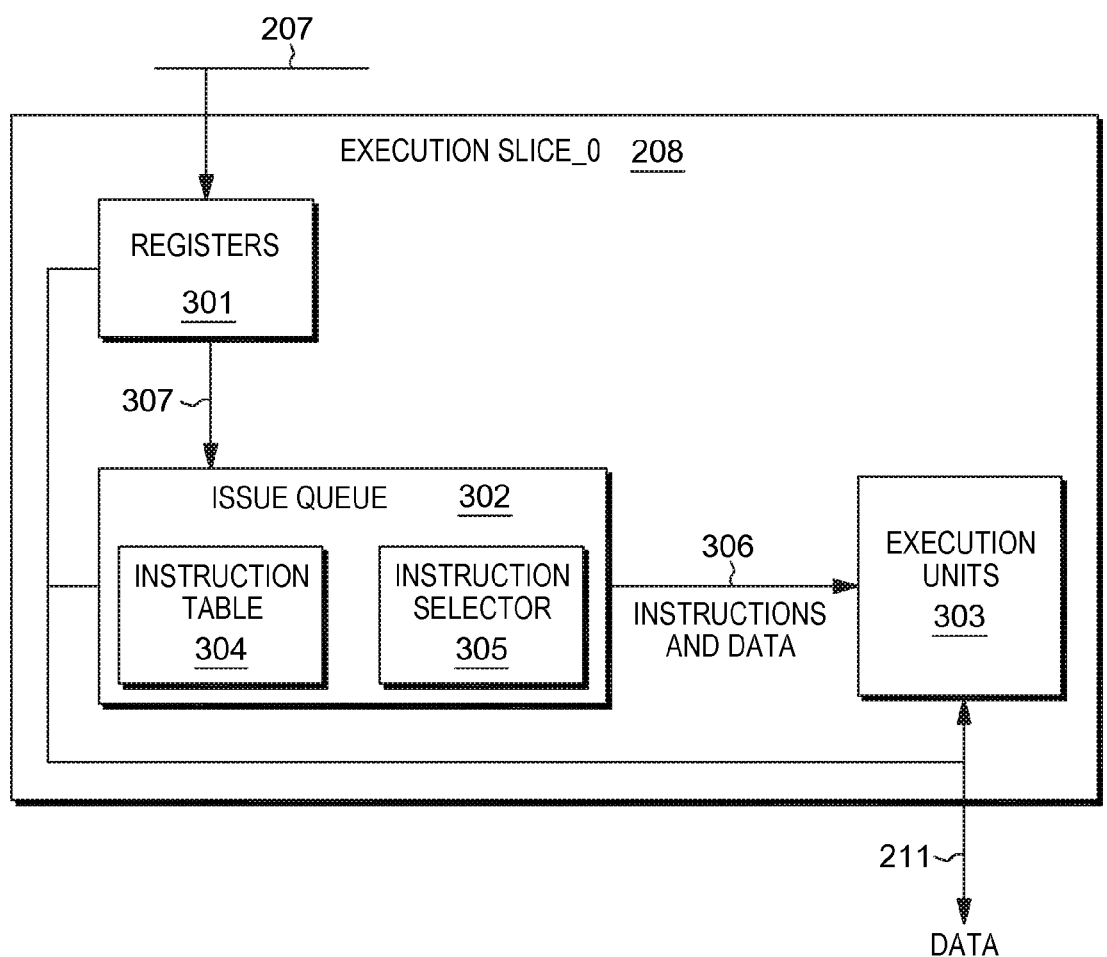
FIG. 3 depicts a block diagram of execution slice_0 that is depicted in FIG. 2, in accordance with an embodiment of the present invention.

FIG. 3 depicts execution slice_0 208 in more detail. The internal structures of execution slices execution slice_1 209 through execution slice_N 210 are essentially similar to that of execution slice_0 208. In an embodiment, execution slice_0 208 contains registers 301, issue queue 302, and execution units 303. Issue queue 302 contains instruction table 304 and instruction selector 305. Registers 301 can receive instructions from dispatcher_0 203 and n other dispatchers (dispatcher_1 204 through dispatcher_N 205), over dispatcher bus 207. Registers 301 provides operand source data to the instructions when registers 301 has the data and maps the source of operands in the instructions to other operand sources when operands are not immediately available in registers 301. Registers 301 forwards the instructions that it receives over register bus 307 to instruction table 304 in issue queue 302.

In an embodiment, instruction table 304 determines which instructions that it holds are ready for execution. In an embodiment, instruction table 304 contains 12 instructions, but one skilled in the art knows that instruction table 304 can be constructed to contain any number of instructions. An instruction is ready for execution when the instruction has access to all the source operands that the instruction requires to execute (i.e., all data that are inputs to the instruction). Instruction table 304 informs instruction selector 305 as to which instructions in the 12 instructions that it can contain are ready to execute by asserting a value of TRUE on one or more of the 12 bits that comprise ready bus 403. Instruction selector 305 selects the oldest ready instruction in instruction table 304 (i.e., the instruction that is ready for execution and has been in instruction table 304 for the longest time relative to other ready instructions) and sends the instruction to execution units 303 for execution. Execution units 303 executes an instruction that is received from issue queue 302 and places data that is the result of the execution of the instruction on execution slice bus 211.

Figure 4:
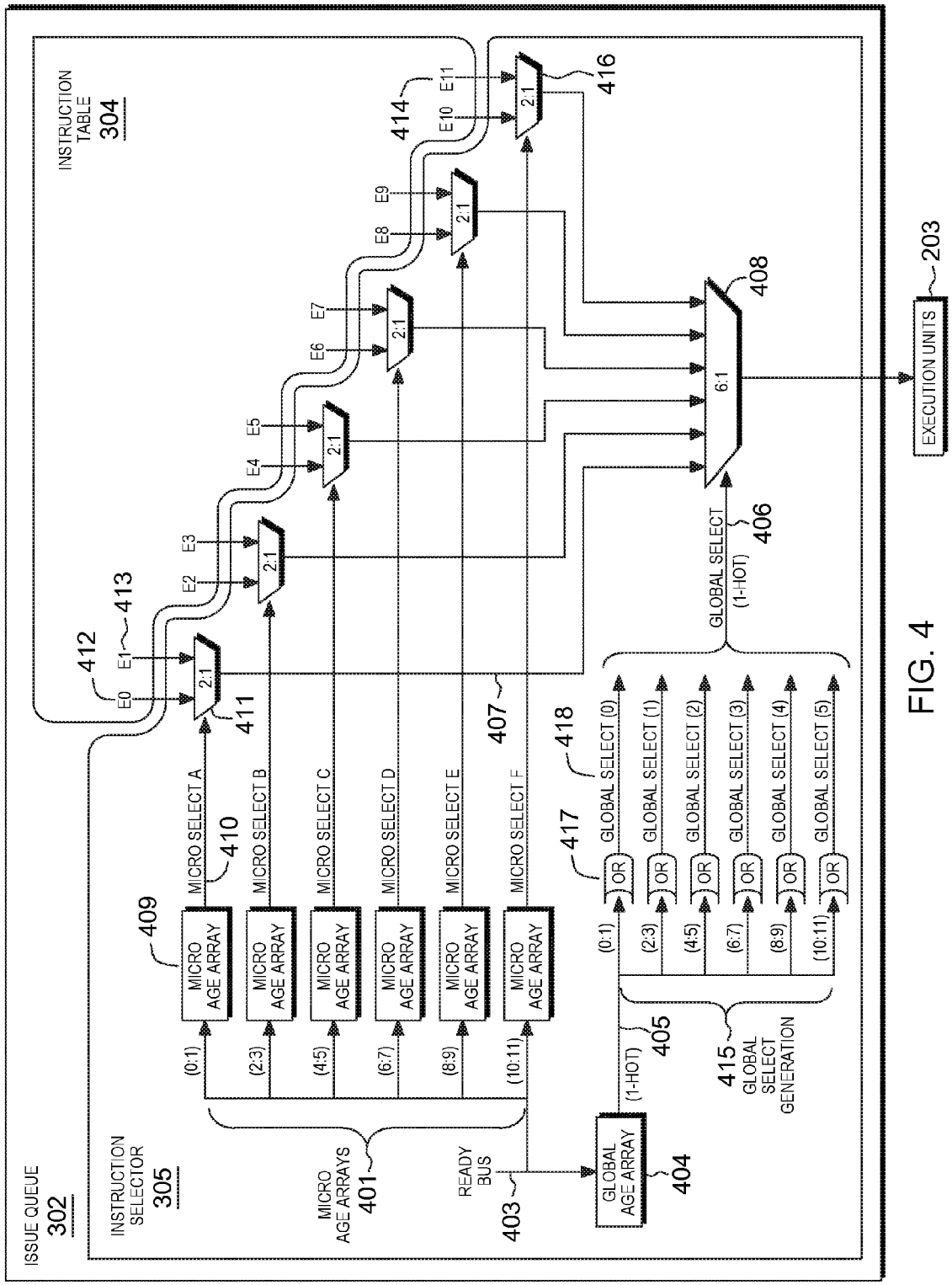
FIG. 4 depicts a detail of the issue queue that is depicted in FIG. 3, in accordance with an embodiment of the present invention.

FIG. 4 depicts issue queue 302, instruction selector 305, and instruction table 304 in more detail. In some scenarios and embodiments, instruction selector 305 contains global age array 404 and micro age arrays 401. Instruction selector 305 uses global age array 404 and micro age arrays to track the age of instructions in instruction table 304 and to select the oldest ready instruction in instruction table 304. In an embodiment, global age array 404 tracks the relative ages of all the instructions in instruction table 304, and micro age arrays 401 tracks the relative ages of instructions in pairs of entries in instruction table 304. In an embodiment, instruction table 304 contains twelve entries (e.g., entry E0 412 and entry E11 414) and each entry can contain one instruction. Therefore global age array 404 tracks the relative age of up to 12 instructions in instruction table 304 and micro age arrays 401 tracks the relative age of up to two instructions in each of six pairs of entries in instruction table 304. One skilled in the art knows that the relative age of any number of instructions can be tracked in like manner.

In some scenarios and embodiments, instruction table 304 determines which of the instructions that it contains are ready for execution, i.e., it identifies those instructions that currently have access to their operands. In an embodiment, instruction table 304 represents the ready state of an instruction in an entry with a bit associated with the entry, one bit per entry, on ready bus 403. In an embodiment, a bit with a value of TRUE on ready bus 403 signals that the associated entry in instruction table 304 holds an instruction that is ready for execution. Multiple instructions in instruction table 304 can be ready at any given time; therefore instruction table 304 can assert multiple TRUE bits simultaneously on ready bus 403.

In some scenarios and embodiments, instruction selector 305 tracks the relative ages of all the instructions in instruction table 304 with two separate tracking logics that operate concurrently, a first tracking logic and a second tracking logic. The first tracking logic tracks the relative ages of up to 6 pairs of instructions instruction table 304, where each pair of instructions is in a pair of entries called an entry subset, and selects the oldest ready instruction (called a candidate instruction) in each entry subset. A candidate instruction is the older of up to two ready instructions in an entry subset. The second tracking logic tracks the relative ages of all instructions in instruction table 304 and selects the oldest candidate instruction from the up to six candidate instructions that are selected by the first tracking logic. Embodiments of the present invention recognize that performing two instruction selections concurrently (with the first tracking logic and the second tracking logic) decreases the time required to select and route an oldest ready instruction in instruction table 304 to execution units 203.

The first tracking logic is comprised of micro age arrays 401 and six 2:1 routing multiplexers, e.g., 2:1 routing multiplexer 411 and 2:1 routing multiplexer 416. The first tracking logic selects and routes up to six candidate instructions from six entry subsets in instruction table 304 to final selection multiplexer 408, which is controlled by the second tracking logic. An entry subset is comprised of two entries in instruction table 304 whose contents are tracked by a single micro age array in micro age arrays 401. For example, micro age array 409 tracks the relative ages of instructions in an entry subset comprised of entry E0 412 and entry E1 413.

Sometimes an entry subset does not contain a candidate instruction, as instructions become ready to execute and are inserted into and issued from instruction table 304 according to the data dependencies and nature of the code being executed in execution slice_0 208. Therefore, at most one candidate instruction is selected from each entry subset by each of six micro age arrays in micro age arrays 401.

In an embodiment, if neither entry in an entry subset that is tracked by a micro age array contains a candidate instruction (i.e., at least one instruction that is ready to execute), the micro age array selects the contents of the even numbered instruction table entry in the entry subset (with the 2:1 routing multiplexer that is controlled by the micro age array). For example, micro age array 409 selects entry E0 412 with 2:1 routing multiplexer 411 if neither entry E0 412 nor entry E1 413 contain a candidate instruction. While erroneous data can be selected and routed to final selection multiplexer 408 by default, this erroneous data is not selected by final selection multiplexer 408, which is controlled by the second tracking logic. The second tracking logic ensures that the final candidate instruction selected by final selection multiplexer 408 for routing to execution units 203 is a valid candidate instruction. All micro age arrays in micro age arrays 401 operate in an essentially similar manner as micro age array 409 operates.

In some scenarios and embodiments, a micro age array in micro age arrays 401 selects a content of one of the two entries in an entry subset by asserting a logic TRUE or FALSE on a 1-bit micro select bus that is connected to the micro age array. Each 1-bit micro select bus is the select input to a 2:1 routing multiplexer that selects the content of an entry in an entry subset. Each of the six 2:1 routing multiplexers routes the contents of an entry in an entry subset that contains a candidate instruction to an input on final selection multiplexer 408. For example, micro age array 409 asserts a TRUE or a FALSE logic level on 1-bit micro select bus micro select A 410, which controls 2:1 routing multiplexer 411. In an embodiment, micro age array 409 asserts a TRUE on bus micro select A 410 to select the content of entry E0 412 and FALSE on micro select A 410 to select the content of entry E1 413. The selected content is asserted on candidate bus 407, which is an input to final selection multiplexer 408.

In some scenarios and embodiments, instruction table 304 generates ready bus 403, which is a 12-bit bus that has one bit associated with each entry in instruction table 304 in one-to-one correspondence. In an embodiment, ready bus 403 specifies an entry in instruction table 304 that contains an instruction that is ready to execute by asserting a TRUE logic level on the bit that is associated with the entry. Multiple bits on ready bus 403 can be TRUE concurrently because a plurality of instructions in instruction table 304 can be ready to execute. While a plurality of instructions can be ready to execute, only one of the ready instructions in instruction table 304 is the oldest ready instruction.

In an embodiment, each micro age array in micro age arrays 401 monitors the 2-bits on ready bus 403 that are associated with the two entries whose contents it tracks. A micro age array monitors the 2-bits that are associated with the entries in the entry subset that the micro age array tracks. For example, micro age array 409 tracks the relative age of an instruction that can be in entry E0 412 or in entry E1 413. Therefore micro age array 409 monitors bit 0 and bit 1 on ready bus 403 to determine if there are ready instructions in corresponding entries entry E0 412 and/or entry E1 413.

In some scenarios and embodiments, the second tracking logic is comprised of global age array 404, global select generation 415, and 6:1 final selection multiplexer 408. The second tracking logic selects the oldest ready instruction from the up to six candidate instructions that are routed to inputs on 6:1 final selection multiplexer 408 by micro age arrays 401. Global age array 404 monitors ready bus 403 to determine which entries in instruction table 304 contain an instruction that is ready to execute. Global age array 404 tracks the relative ages of all 12 instructions in instruction table 304 and identifies the oldest ready instruction of the 12 instructions in instruction table 304 by asserting a TRUE logic level on 1-bit in 12-bit address bus 405. The 12-bits on address bus 405 are associated with the contents of the 12 entries in instruction table 304 in a one-to-one correspondence. Address bus 405 is called a 1-hot bus because one and only one bit on the bus can have a value of TRUE at any time. A bit on address bus 405 with a value of TRUE indicates that the entry in instruction table 304 that is associated with the bit contains the oldest ready instruction in instruction table 304. The contents of address bus 405 are processed by logic in global select generation 415 to generate at most one bit on global select bus 406 that indicates an entry subset in instruction table 304 that contains the oldest ready instruction in instruction table 304.

In an embodiment, the position of a TRUE bit on global select bus 406 designates an entry subset that contains the oldest ready instruction in instruction table 304. Global select bus 406 is a 1-hot bus that is 6-bits wide. Each bit on global select bus 406 is generated by ORing a pair of bits on address bus 405 that are associated with a pair of entries in an entry subset. Therefore if either of the two entries in the entry subset contain the oldest ready instruction in instruction table 304, the bit on global bus 406 that is associated with the entry subset will be TRUE. Only one bit on global select bus 406 can be TRUE at any time. Global select bus 406 selects at most one candidate instruction on an input to final selection multiplexer 408 for issue to execution units 203.

For example, if an instruction in entry E0 412 is the oldest ready instruction in instruction table 304, global age array 404 asserts a TRUE on bit-0 of address bus 405 which is applied to an input of 2-input OR gate 417. A TRUE on either input to 2-input OR gate 417 causes its output to be TRUE, i.e., the global select(0) 418 bit becomes TRUE. A TRUE on global select(0) 418 indicates that the oldest ready instruction in instruction table 304 is either in entry E0 412 or in entry E1 413 and causes final selection multiplexer 408 to select the candidate instruction on candidate bus 407 to issue to execution units 203.

Therefore micro age arrays 401 in the first tracking logic is used to select and route up to six candidate instructions (i.e., the oldest ready instruction in each of six pairs of instructions) and global age array 404 in the second tracking logic is used to select the candidate instruction from the six candidate instructions that is the oldest ready instruction of all the instructions in instruction table 304 for issue to execution units 203. Embodiments of the present invention recognize that performing two instruction selections concurrently (with the first tracking logic and the second tracking logic) decreases the time required to select and route an oldest ready instruction in instruction table 304 to execution units 203.

Figure 5:
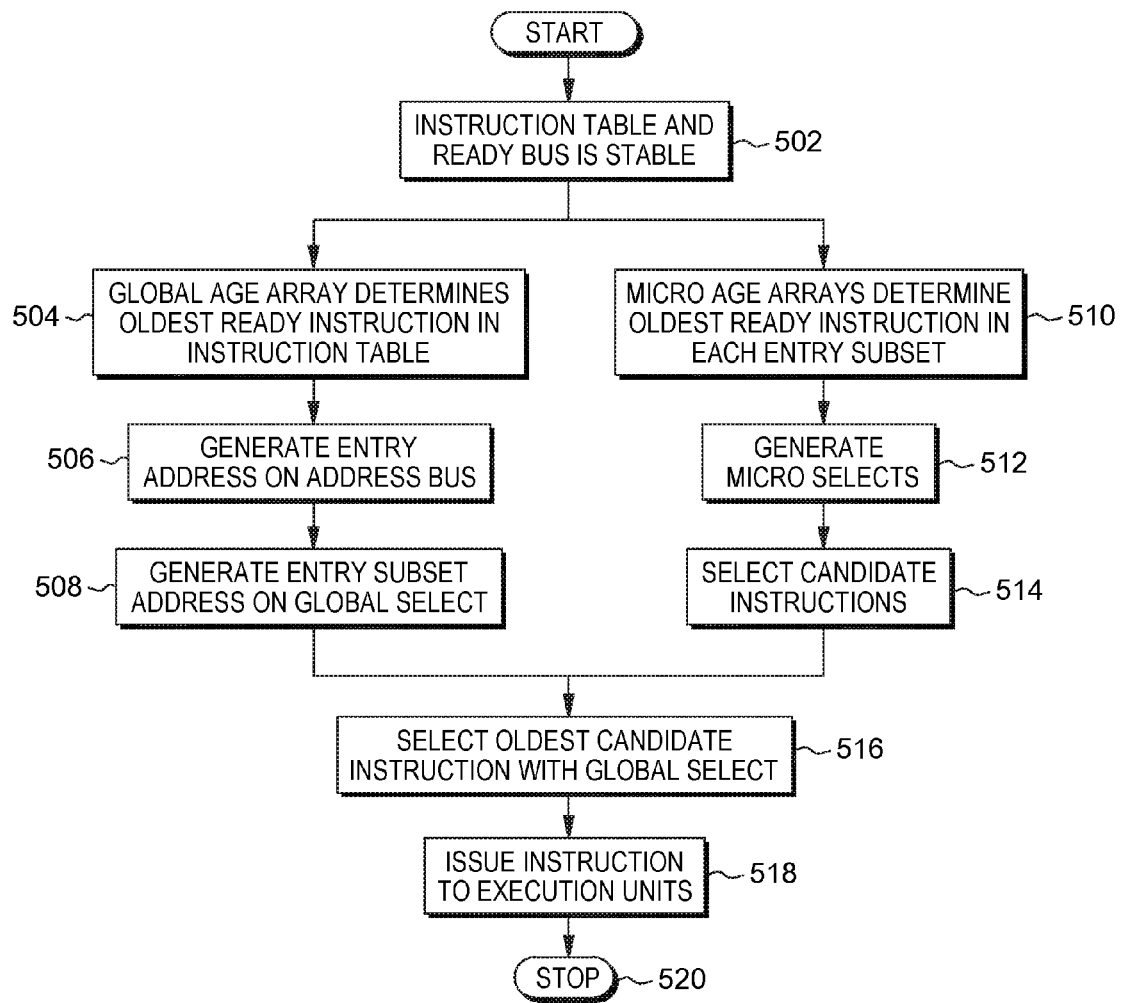
FIG. 5 is a flow chart that depicts the operation of the issue queue that is depicted in FIG. 4, in accordance with an embodiment of the present invention.

FIG. 5 is a flow chart that depicts operations performed by issue queue 302. The contents of instruction table 304 are stable, instructions in instruction table 304 that are ready to execute are identified, and ready bus 403 is stable (step 502). Global age array 404 determines the oldest ready instruction in instruction table 304 (step 504). Global age array 404 identifies an entry that holds the oldest ready instruction in instruction table 304 by asserting the associated TRUE bit on address bus 405 (step 506). Global select generation 415 generates the address of the entry subset in instruction table 304 that holds the oldest ready instruction in instruction table 304 by asserting a TRUE bit on global select bus 406 (step 508). Concurrently with operations in steps 504, 506, and 508, micro age arrays 401 determines the oldest ready instruction in each entry subset in instruction table 304 (step 510). Concurrently with operations in steps 504, 506, and 508, micro age arrays 401 generates six micro selects (step 512). Concurrently with operations in steps 504, 506, and 508, the six micro selects select up to six candidate instructions from entries in instruction table 304 (step 514). Global select bus 406 selects the oldest candidate instruction with final selection multiplexer 408 (step 516). The oldest candidate instruction is issued to execution units 518 (step 518). The operation of issue queue 302 terminates (step 520).

Figure 6:
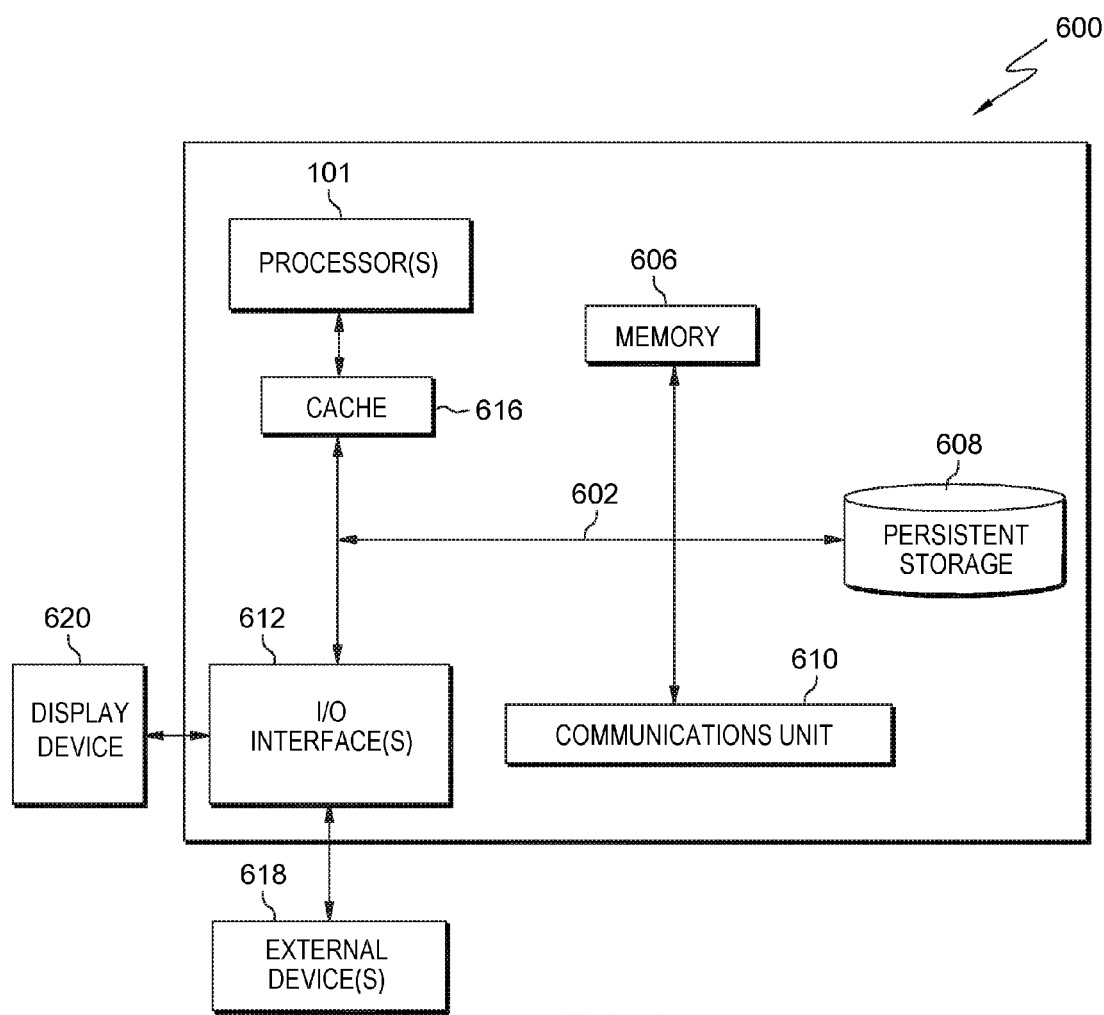
FIG. 6 depicts a block diagram of a computer system that incorporates the processor depicted in FIG. 1, in accordance with an embodiment of the present invention.

FIG. 6 depicts computer system 600 that is an example computer system that incorporates processor 101, a component of multiprocessor computer 100 that includes processor core_0 109, processor core_1 110, and cache 111. Computer system 600 includes communications fabric 602, which provides communications between computer processor 101, memory 606, persistent storage 608, communications unit 610, and input/output (110) interface(s) 612. Communications fabric 602 can be implemented with any architecture designed for passing data and/or control information between processors (such as microprocessors, communications and network processors, etc.), system memory, peripheral devices, and any other hardware components within a system. For example, communications fabric 602 can be implemented with one or more buses.

Memory 606 and persistent storage 608 are computer readable storage media. In this embodiment, memory 606 includes random access memory. In general, memory 606 can include any suitable volatile or non-volatile computer readable storage media. Cache 616 is a fast memory that enhances the performance of processors 101 by holding recently accessed data and data near accessed data from memory 606.

Program instructions and data used to practice embodiments of the present invention may be stored in persistent storage 608 for execution by one or more of the respective processors 604 via cache 616 and one or more memories of memory 606. In an embodiment, persistent storage 608 includes a magnetic hard disk drive. Alternatively, or in addition to a magnetic hard disk drive, persistent storage 608 can include a solid state hard drive, a semiconductor storage device, read-only memory (ROM), erasable programmable read-only memory (EPROM), flash memory, or any other computer readable storage media that is capable of storing program instructions or digital information.

The media used by persistent storage 608 may also be removable. For example, a removable hard drive may be used for persistent storage 608. Other examples include optical and magnetic disks, thumb drives, and smart cards that are inserted into a drive for transfer onto another computer readable storage medium that is also part of persistent storage 608.

Communications unit 610, in these examples, provides for communications with other data processing systems or devices. In these examples, communications unit 610 includes one or more network interface cards. Communications unit 610 may provide communications through the use of either or both physical and wireless communications links. Program instructions and data used to practice embodiments of the present invention may be downloaded to persistent storage 608 through communications unit 610.

I/O interface(s) 612 allows for input and output of data with other devices that may be connected to each computer system. For example, I/O interface 612 may provide a connection to external devices 618 such as a keyboard, keypad, a touch screen, and/or some other suitable input device. External devices 618 can also include portable computer readable storage media such as, for example, thumb drives, portable optical or magnetic disks, and memory cards. Software and data used to practice embodiments of the present invention can be stored on such portable computer readable storage media and can be loaded onto persistent storage 608 via I/O interface(s) 612. I/O interface(s) 612 also connect to a display 620.

Display 620 provides a mechanism to display data to a user and may be, for example, a computer monitor.

The programs described herein are identified based upon the application for which they are implemented in a specific embodiment of the invention. However, it should be appreciated that any particular program nomenclature herein is used merely for convenience, and thus the invention should not be limited to use solely in any specific application identified and/or implied by such nomenclature.

The present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the invention. The terminology used herein was chosen to best explain the principles of the embodiment, the practical application or technical improvement over technologies found in the marketplace, or to enable others of ordinary skill in the art to understand the embodiments disclosed herein.

The terminology used herein is for the purpose of describing particular embodiments only and is not intended to be limiting of the present invention. As used herein, the singular forms "a", "an" and "the" are intended to include the plural forms as well, unless the context clearly indicates otherwise.

Each respective figure, in addition to illustrating methods of and functionality of the present invention at various stages, also illustrates the logic of the method as implemented, in whole or in part, by one or more devices and structures. Such devices and structures are configured to (i.e., include one or more components, such as resistors, capacitors, transistors and the like that are connected to enable the performing of a process) implement the method of merging one or more non-transactional stores and one or more thread-specific transactional stores into one or more cache line templates in a store buffer in a store cache. In other words, one or more computer hardware devices can be created that are configured to implement the method and processes described herein with reference to the Figures and their corresponding descriptions.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiment, the practical application or technical improvement over technologies found in the marketplace, or to enable other of ordinary skill in the art to understand the embodiments disclosed herein.

Embodiments of the present invention may be used in a variety of electronic applications, including but not limited to advanced sensors, memory/data storage, semiconductors, microprocessors and other applications.

A resulting device and structure, such as an integrated circuit (IC) chip can be distributed by the fabricator in raw wafer form (that is, as a single wafer that has multiple unpackaged chips), as a bare die, or in a packaged form. In the latter case the chip is mounted in a single chip package (such as a plastic carrier, with leads that are affixed to a motherboard or other higher level carrier) or in a multichip package (such as a ceramic carrier that has either or both surface interconnections or buried interconnections). In any case the chip is then integrated with other chips, discrete circuit elements, and/or other signal processing devices as part of either (a) an intermediate product, such as a motherboard, or (b) an end product. The end product can be any product that includes integrated circuit chips, ranging from toys and other low-end applications to advanced computer products having a display, a keyboard or other input device, and a central processor.

The corresponding structures, materials, acts, and equivalents of all means or step plus function elements in the claims below are intended to include any structure, material, or act for performing the function in combination with other claimed elements as specifically claimed. The description of the present invention has been presented for purposes of illustration and description, but is not intended to be exhaustive or limited to the invention in the form disclosed. Many modifications and variations will be apparent to those of ordinary skill in the art without departing from the scope and spirit of the invention. The embodiment was chosen and described in order to best explain the principles of the invention and the practical application, and to enable others of ordinary skill in the art to understand the invention for various embodiments with various modifications as are suited to the particular use contemplated.

While the invention has been described in detail in connection with only a limited number of embodiments, it should be readily understood that the invention is not limited to such disclosed embodiments. Rather, the invention can be modified to incorporate any number of variations, alterations, substitutions or equivalent arrangements not heretofore described, but which are commensurate with the spirit and scope of the invention. Additionally, while various embodiments of the invention have been described, it is to be understood that aspects of the invention may be included by only some of the described embodiments. Accordingly, the invention is not to be seen as limited by the foregoing description. A reference to an element in the singular is not intended to mean "one and only one" unless specifically stated, but rather "one or more." All structural and functional equivalents to the elements of the various embodiments described throughout this disclosure that are known or later come to be known to those of ordinary skill in the art are expressly incorporated herein by reference and intended to be encompassed by the invention. It is therefore to be understood that changes may be made in the particular embodiments disclosed which are within the scope of the present invention as outlined by the appended claims.

What is claimed is:

1. A computer program product for selecting and issuing an oldest ready instruction in an issue queue, the computer program product comprising:
    one or more computer-readable storage media and program instructions stored on the one or more computer-readable storage media, the program instructions comprising:
        program instructions to receive one or more instructions into one or more entries in an instruction table in an issue queue;
        program instructions to identify instructions that are ready to execute among the one or more instructions in the instruction table with a ready bus;
        program instructions to represent an age of each of the one or more instructions in the instruction table in a first age array wherein an age of an instruction is an age that is relative to each of the one or more instructions in the first age array;
        program instructions to generate one or more subsets of the one or more instructions that are associated in one-to-one correspondence with one or more subset age arrays, wherein a subset age array holds a representation of an age of up to 2 instructions in an associated subset that is relative to each of the one or more instructions in the associated subset;
        program instructions to generate i) a first 1-hot signal that identifies an oldest ready instruction with an age represented in the first age array and is identified as ready on the ready bus, and ii) an associated second 1-hot signal that identifies an oldest ready instruction with an age that is represented in the associated subset age array with each subset age array and is identified as ready on the ready bus;
        program instructions to select with each second 1-hot signal, a candidate instruction in the issue queue that is represented in the subset age array that is associated with the second 1-hot signal, wherein a candidate instruction is an oldest ready instruction represented in a subset age array;
        program instructions to select a candidate instruction with the first 1-hot signal; and
        program instructions to issue the candidate instruction with the first 1-hot signal.

* * * * *